United States Patent [19]

Bohn

[11] Patent Number: 4,888,638

[45] Date of Patent: Dec. 19, 1989

[54] SYSTEM FOR SUBSTITUTING TELEVISION PROGRAMS TRANSMITTED VIA TELEPHONE LINES

[75] Inventor: Jerry W. Bohn, Barrington, Ill.

[73] Assignee: A. C. Nielsen Company, Northbrook, Ill.

[21] Appl. No.: 255,836

[22] Filed: Oct. 11, 1988

[51] Int. Cl.$^4$ .............................................. H04H 9/00
[52] U.S. Cl. ...................................... 358/84; 358/85; 455/2
[58] Field of Search ................................. 358/84–86; 379/53, 92; 455/2, 4, 5

[56] References Cited

U.S. PATENT DOCUMENTS

| | | | |
|---|---|---|---|
| 3,639,686 | 2/1972 | Walker et al. | 455/4 X |
| 4,331,973 | 5/1982 | Eskin et al. | 358/84 |
| 4,331,974 | 5/1982 | Cogswell et al. | 358/86 |
| 4,404,589 | 9/1983 | Wright, Jr. | 358/86 |
| 4,546,382 | 10/1985 | McKenna et al. | 358/84 |
| 4,566,030 | 1/1986 | Nickerson et al. | 358/84 |
| 4,630,108 | 12/1986 | Gomersall | 358/84 |
| 4,724,491 | 2/1988 | Lambert | 358/86 X |
| 4,733,301 | 3/1988 | Wright, Jr. | 358/86 X |
| 4,805,020 | 2/1989 | Greenberg | 358/84 X |
| 4,814,883 | 3/1989 | Perine et al. | 358/84 X |

FOREIGN PATENT DOCUMENTS 221743 5/1987 European Pat. Off. .
88/10047 12/1988 World Int. Prop. O. .

Primary Examiner—Keith E. George
Attorney, Agent, or Firm—Mason, Kolehmainen, Rathburn & Wyss

[57] ABSTRACT

A market research system is shown for substituting stored television programs for regularly scheduled, broadcast television programs having a particular identification code wherein the substitute television programs may be transmitted via telephone lines to the households of cooperating panelists for storage. The substitute television programs may be stored and/or transmitted to the panelists's home in compacted or noncompacted form. In compacted form, a memory stores the first frame of video information for the substitute television program and for subsequent frames, stores only the video information representing a change from the video information stored for a previous frame. In one embodiment, the stored video information represents the difference between each frame and the first frame. In a second embodiment, the video change information represents the differences between each frame and the immediately preceding frame. A system for encoding an identification code in the leading overscan portion of the active line period of a horizontal line of video information is also shown.

68 Claims, 10 Drawing Sheets

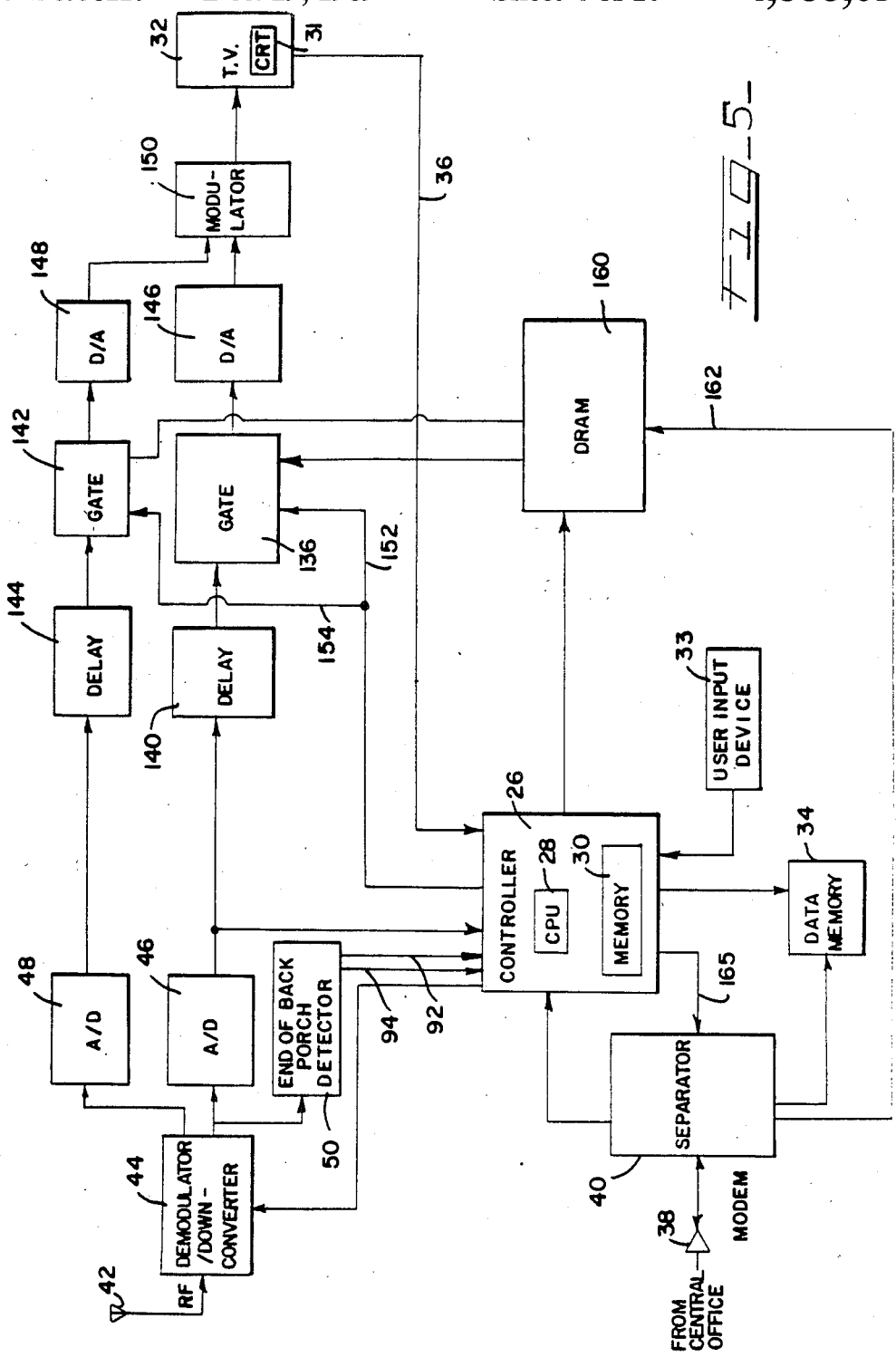

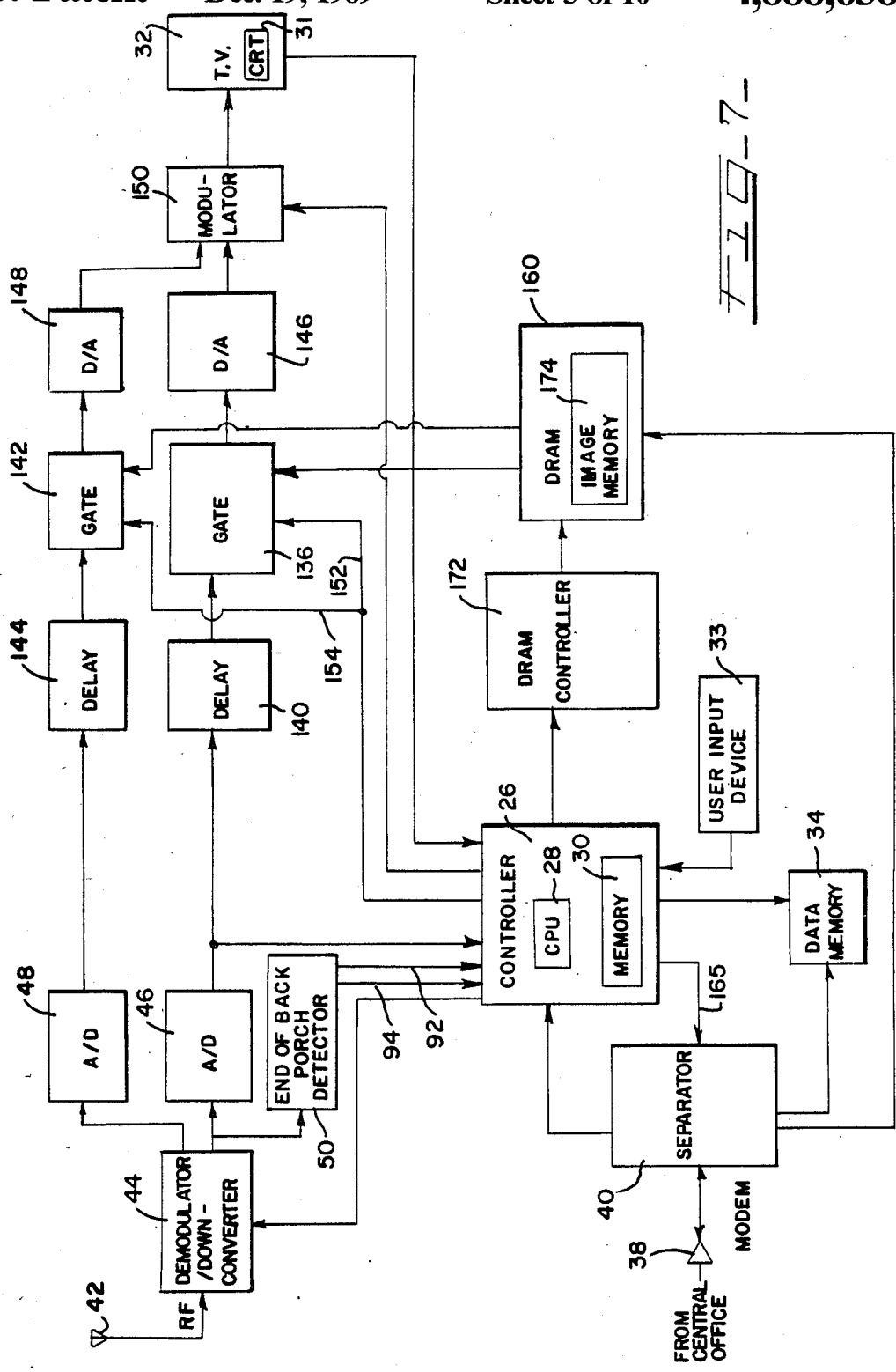
FIG-7-

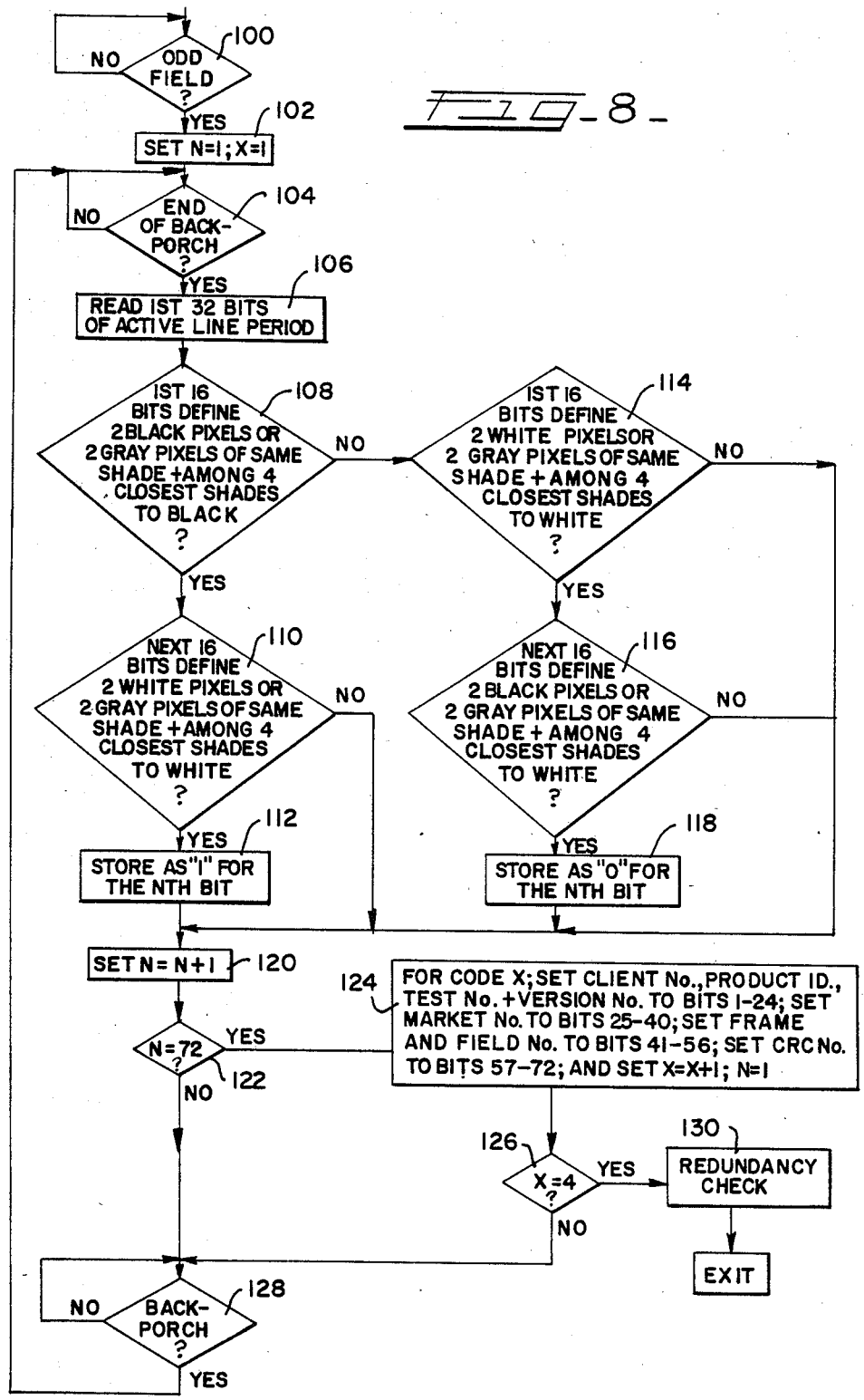

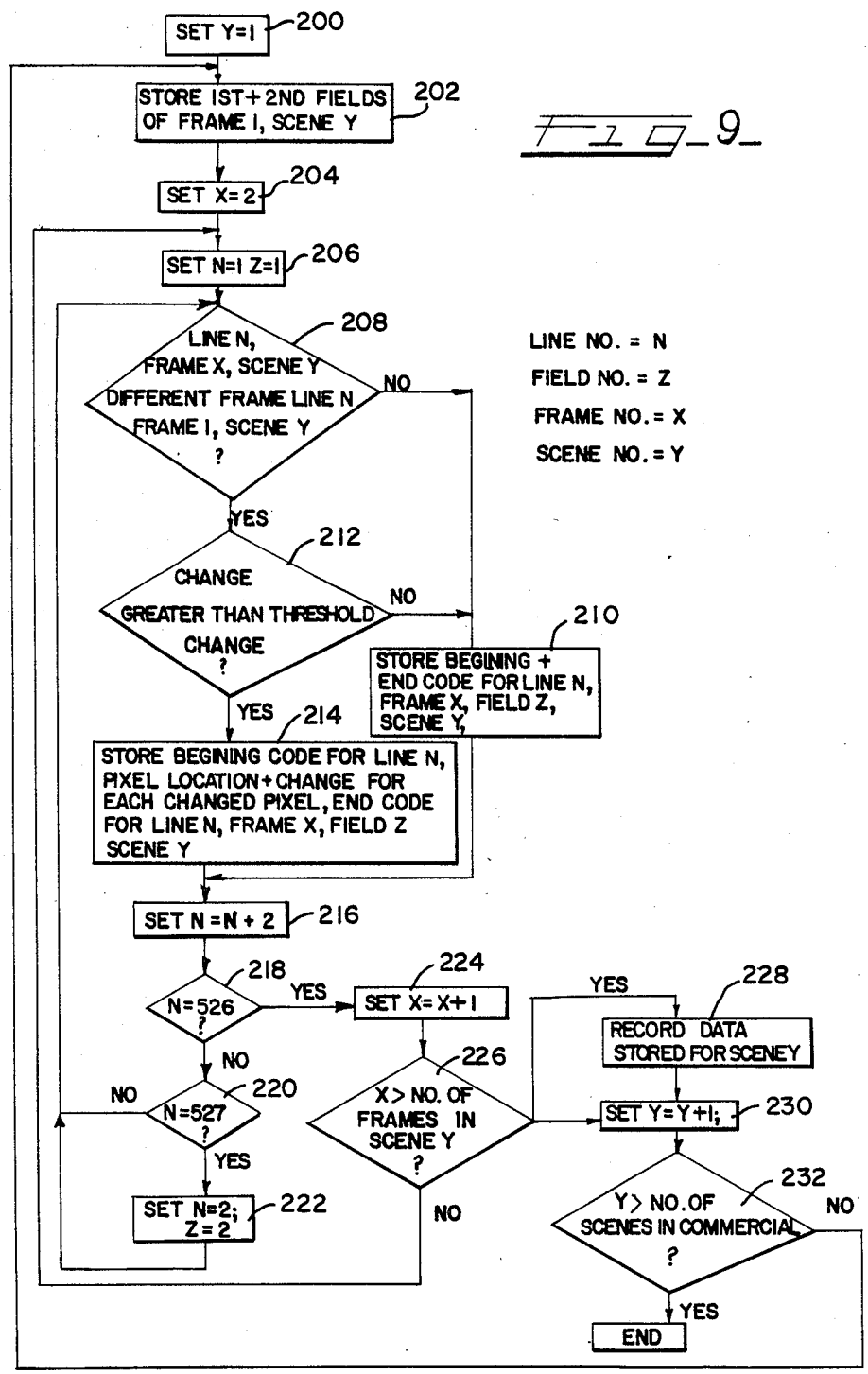

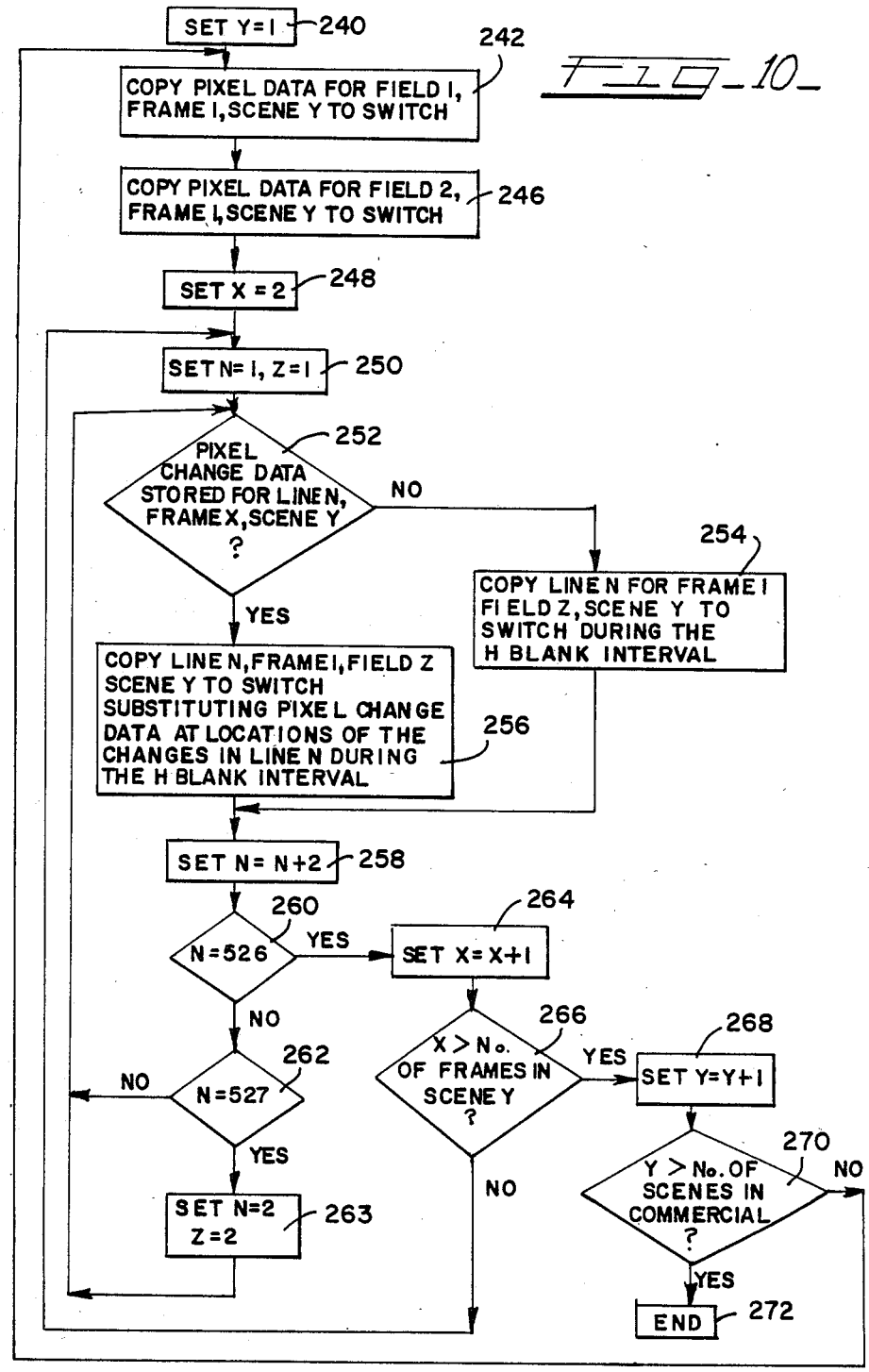

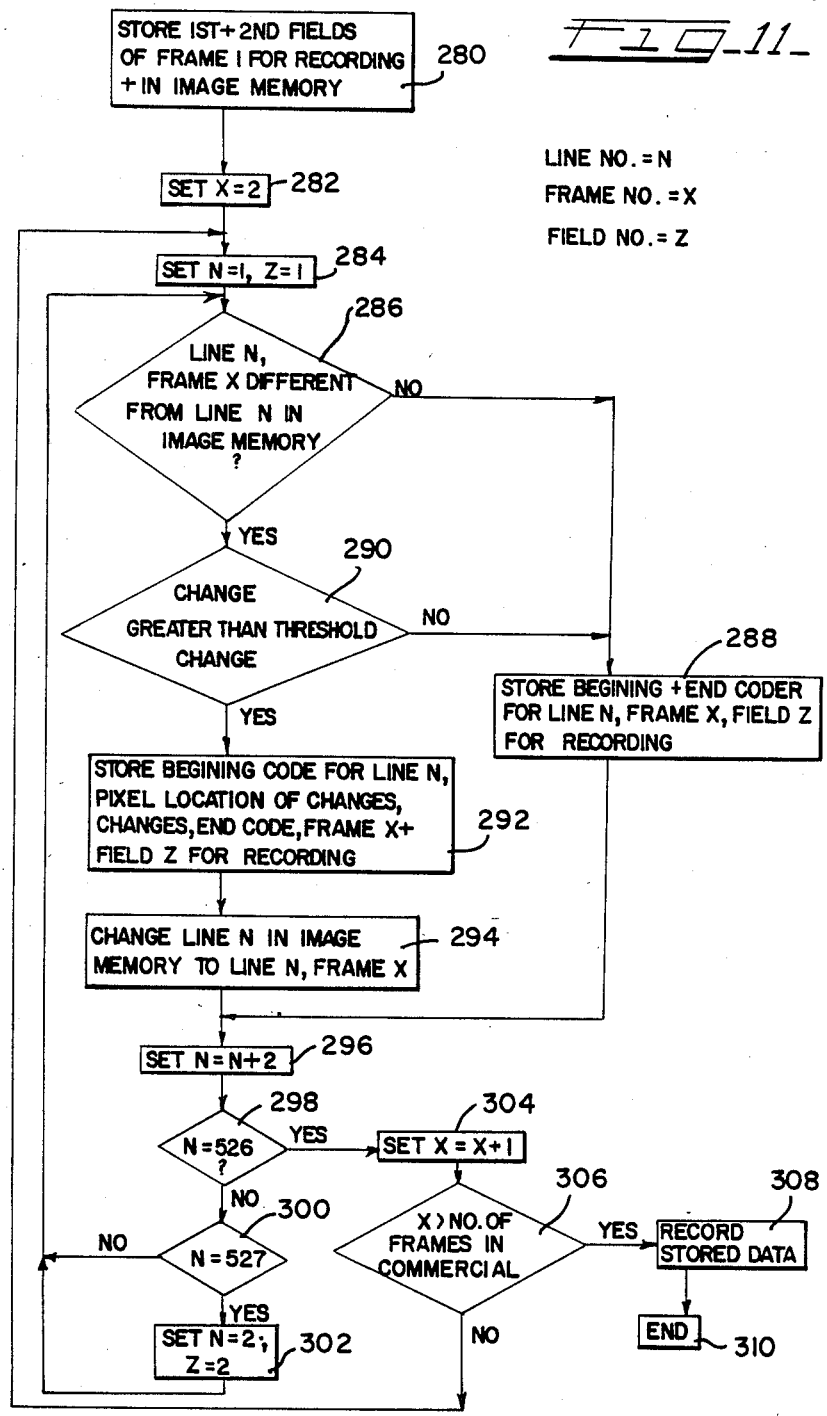

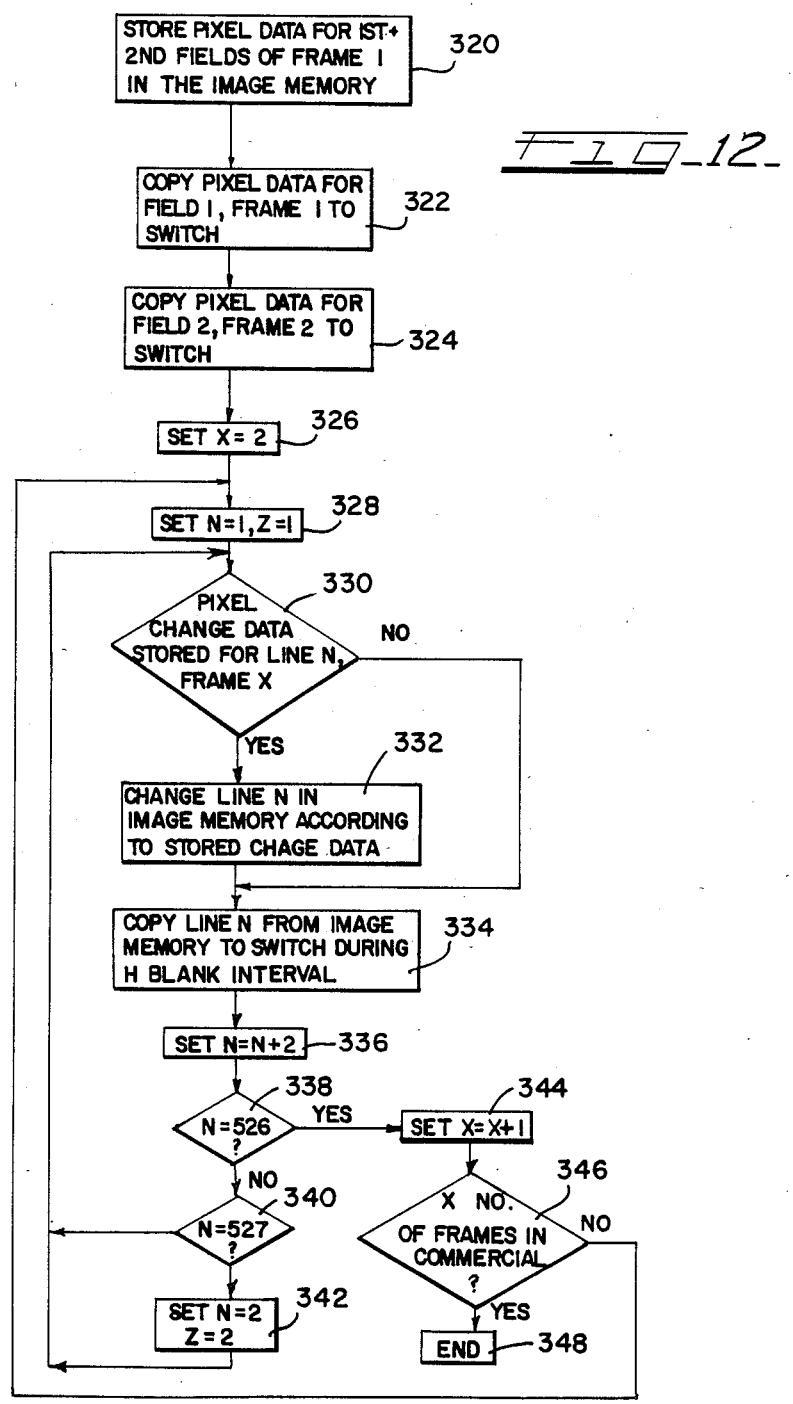

SYSTEM FOR SUBSTITUTING TELEVISION PROGRAMS TRANSMITTED VIA TELEPHONE LINES

BACKGROUND OF THE INVENTION

1. Field of the Invention

The present invention relates to a marketing research system for substituting a stored television program for a scheduled television program and more particularly, to such a system wherein the substitute television program is transmitted to a cooperating household over a telephone line from a central office.

2. Description of the Prior Art

In order to collect market research data, systems are known that automatically monitor the televisions in the households of cooperating panelists. These systems typically monitor the on-off state of a television and identify the channel being viewed. This information is typically accumulated over an entire broadcast day and stored in a small computer installed in each cooperating household wherein the computer organizes the accumulated information for transmission over telephone lines at the end of a broadcast day to a central computer. Examples of such systems are disclosed in U.S. Pat. Nos. 3,651,471; 3,742,462; 3,742,463; 3,772,649; 3,973,206; 4,025,851; and 4,048,562. These systems, however, lack flexibility in that they cannot accommodate substitute programming to permit the testing of viewer's responses to substitute commercials.

Systems are known in which a substitute television signal is broadcast over VHF or UHF as shown in U.S. Pat. No. 3,639,686. Other known systems transmit a substitute television signal via a microwave transmitter or satellite transponder as shown in U.S. Pat. No. 4,630,108. Systems for transmitting substitute television signals over one or more unused cable channels in a cable television network are also known as shown in U.S. Pat. Nos. 4,331,973 and 4,331,974. However, each of these systems requires a broadcasting station to transmit the substitute television signals at the time in which the signals are to be displayed on a television. The operation of such broadcasting stations is very costly.

SUMMARY OF THE INVENTION

In accordance with the present invention, the disadvantages of prior art market research systems as discussed above, have been overcome. The market research system of the present invention substitutes stored television programs for regularly scheduled and broadcast television programs having a particular identification code wherein the substitute television programs may be transmitted via telephone lines to the households of cooperating panelists for storage. Because the substitute television programs are stored, the system of the present invention does not require a present a broadcasting station.

More particularly, the system of the present invention includes means for receiving regularly scheduled television programs. Such means may include an antenna and a combined demodulator/down converter or a non-cable household or a cable television signal distribution cable and a demodulator/down converter for a cable household. The receiving means is coupled to a gating means to which a memory that stores a substitute television program is also coupled. The receiving means is further coupled to a back porch detector. A controller is responsive to the output of the back porch detector to detect an identification code, if any, encoded on a received, regularly scheduled television program. Based on the detected identification code, the controller determines whether the regularly scheduled program identified by the code is to be substituted for. If the detected identification code corresponds to a predetermined identification code, the controller controls the gating means to pass the substitute program stored in the memory to the panelist's television. If, however, no identification code is detected or a different identification code is detected, the gating means is controlled by the controller to pass the regularly scheduled television program to the panelist's television.

In a first embodiment, the memory that stores the substitute television program is a laser disc that is delivered to the panelist's home. In a second embodiment, the memory is a mass storage device such as a dynamic random access memory (DRAM). In the second embodiment, the substitute television program is transmitted over one or more communication networks including a standard residential telephone line from a central office to a panelist's household for storage in the DRAM. The substitute television program may be transmitted and stored in compacted or non-compacted form. In compacted form, the substitute program memory stores a first frame of video information for the substitute television program and for subsequent frames, the substitute program memory stores only video information representing a change from the video information stored for a previous frame. In one embodiment, the stored, video change information represents the differences between each frame in a scene of the television program and the first frame of the scene. In another embodiment, the video change information represents the differences between each frame of the television program and the immediately preceding frame.

The identification code of a regularly scheduled television program is encoded in the overscan portion of the program's video information. More particularly, the identification code is encoded in whole or in part in the leading overscan portion of the active line period of a horizontal line of video information. In one embodiment, the whole identification code is encoded in each of a number of horizontal lines of a field of each frame of the television program. In another embodiment, one bit of the code information is encoded in a horizontal line of video information, the one bit of code information being defined by the digital representations of four pixels in the overscan portion of that horizontal line. The identification code may, for example, include 9 bytes or 72 bits of information so that 72 horizontal lines are required, with four pixels in each line defining one bit of the identification code. For redundancy, the identification code is repeated multiple times per field of each frame in which it is encoded. In the preferred embodiment, the identification code is encoded in each odd field of each frame of video information. For each frame in which the identification code is encoded, the identification code includes information identifying the frame number. If a panelist turns his television on at a frame in the middle of a regularly scheduled television program that is to be substituted for, the controller identifies the number of that frame from the detected identification code. The controller then couples to the television the frame of the substitute program having the same number as the identified frame of the regularly scheduled television program, the controller thereafter coupling the subsequent frames of the substitute program so that it will appear that the television has been turned on in the middle of the substitute television program. This feature is provided so that a viewer cannot discern that a substitute television program as opposed to a regularly scheduled television program is being displayed and to ensure that the substitute program ends when the regularly scheduled program would have ended if displayed on the television.

The market research system of the present invention further includes a user input device such as a keyboard or a scanning wand to allow a panelist to enter market research data to the system. At preprogrammed times, the system transmits the collected market research data to the central office. At this time the central office transmits back to the system in the panelist's home instructions identifying the identification code of a television program to be substituted for and the identity of the substitute television program. The central office also transmits one or more substitute television programs in compacted or non-compacted form if the system in the panelist's home includes a mass storage random-access memory.

These and other objects, advantages and novel features of the present invention, as well as details of an illustrated embodiment thereof, will be more fully understood from the following description and the drawing.

BRIEF DESCRIPTION OF THE DRAWING

FIG. 5 is a block diagram of a second embodiment of the video substitution system shown in FIG. 1;

FIG. 6 is a block diagram of the compress system of the present invention;

FIG. 7 is a block diagram of a third embodiment of the video substitution system shown in FIG. 1;

FIG. 8 is a flow chart illustrating the identification code detection operation of the controller illustrated in FIGS. 2, 5 and 7;

FIG. 9 is a first embodiment of a compression routine utilized by the system shown in FIG. 6;

FIG. 10 is a first embodiment of a routine for expanding data compressed according to the routine depicted in FIG. 9;

FIG. 11 is a second embodiment of a compression routine utilized by the system shown in FIG. 6; and FIG. 12 is a second embodiment of the routine for expanding compressed video information compressed according to the routine shown in FIG. 11.

DESCRIPTION OF THE PREFERRED EMBODIMENT

Figure 1:
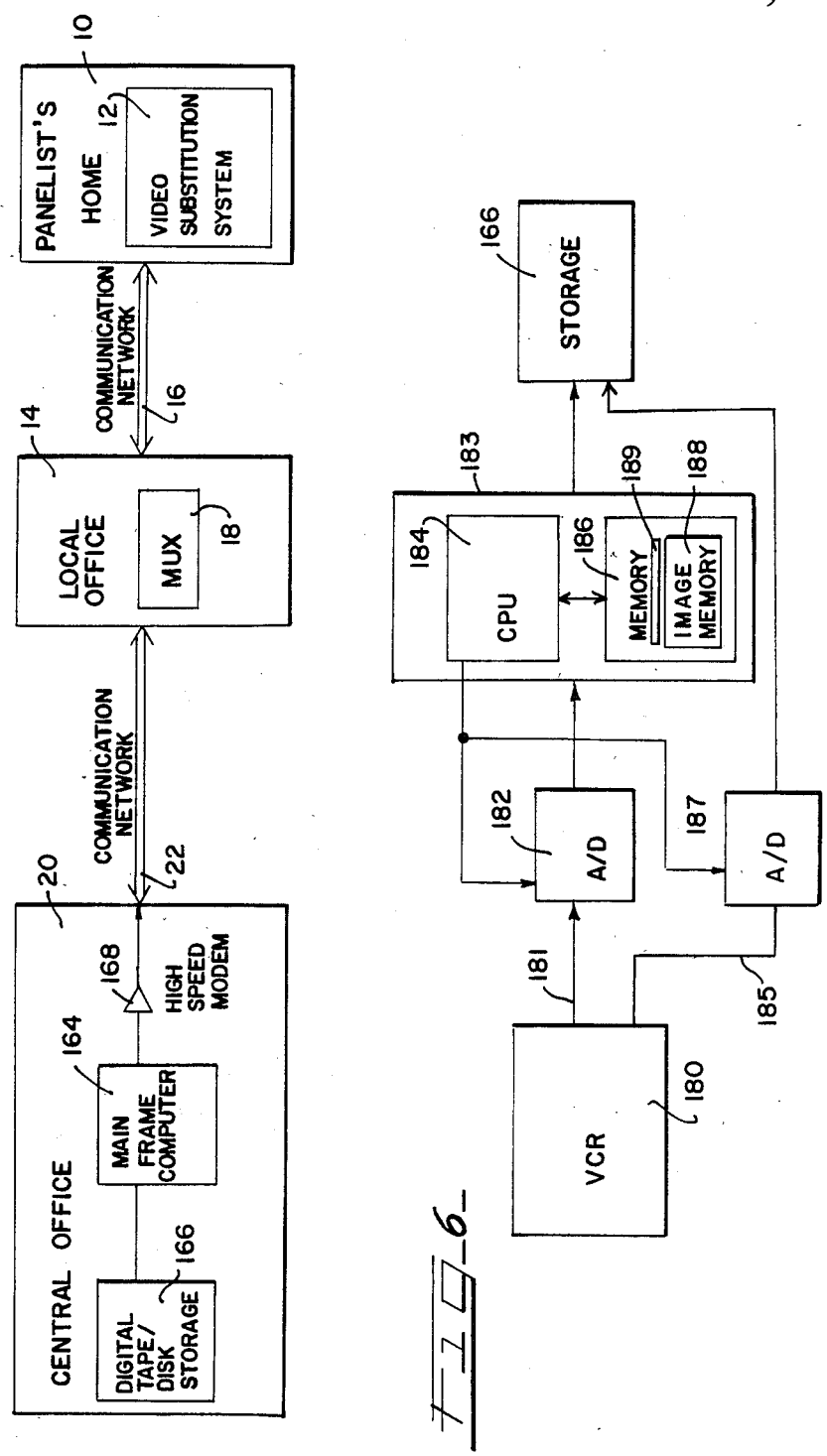
FIG. 1 is a block diagram of the overall marketing research system of the present invention.
Figure 2:
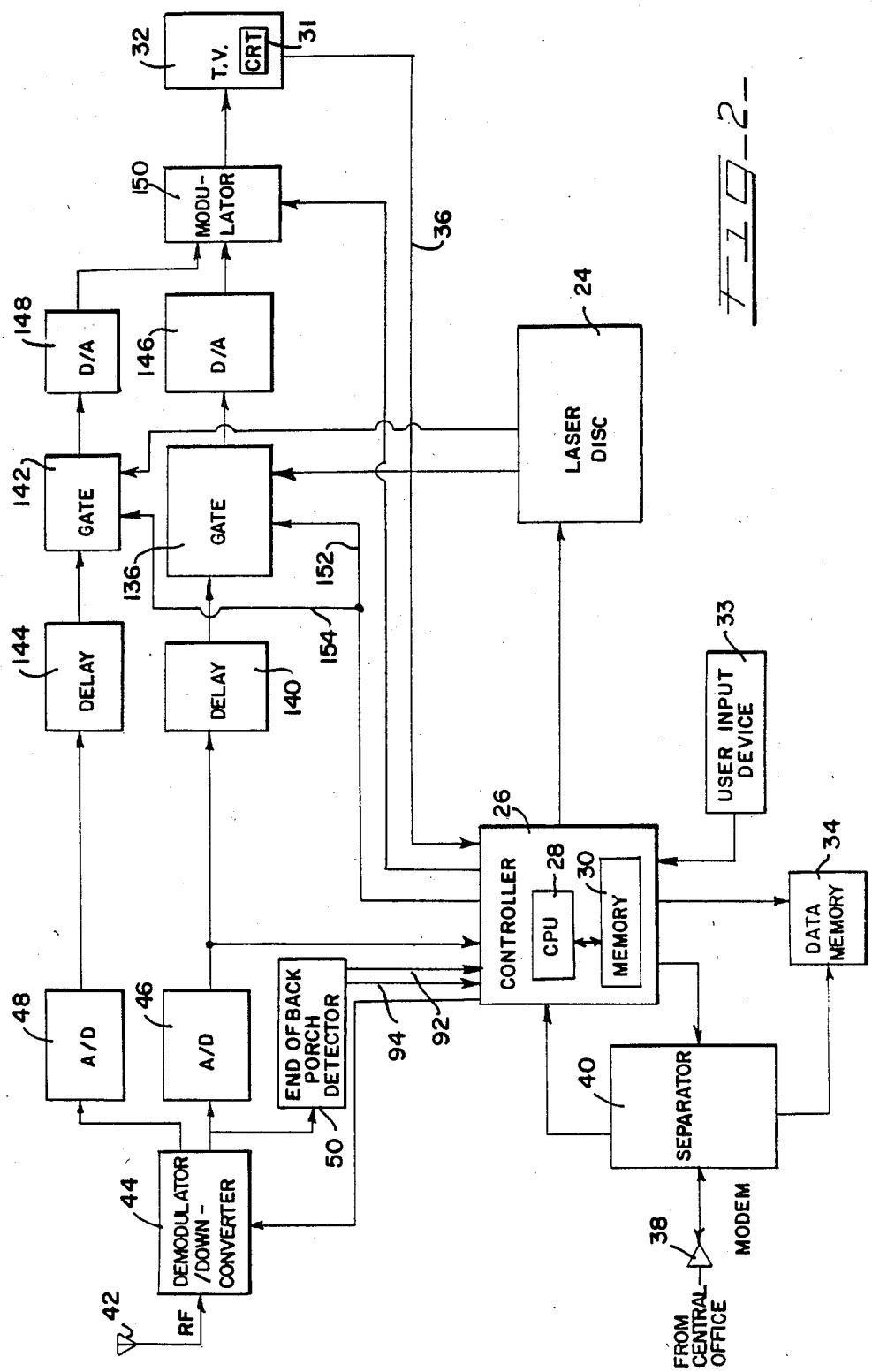
FIG. 2 is a block diagram of the first embodiment of the video substitution system shown in FIG. 1.

It is often desirable to test consumer's reactions to television programs such as commercials to determine their effectiveness. The market research system of the present invention as shown in FIG. 1 provides an effective method of testing television programs such as commercials by substituting regularly scheduled television commercials with substitute television commercials stored in a memory. The memory may be a laser disc memory 24 as shown in FIG. 2, periodically delivered to a panelist's home 10 for use in the video substitution system 12 that is coupled to the panelist's television 32 so that the substitute television commercial may be displayed on the cathode ray tube display 31 of the television 32. Alternatively, the memory may be a mass storage random access memory such as a DRAM 160 as discussed in detail with respect to FIGS. 5 and 7 for two alternative embodiments of the video substitution system 12, wherein a substitute television program is transmitted to the panelist's home from a local office 14 via a standard communication network such as a residential telephone line 16. The local office 14 includes a multiplexer 18 that distributes the substitute television program to a number of panelist's homes after it is received from a central office 20 wherein the central office 20 transmits the substitute television program over a communication network 22. The communication network 22 preferably has a broader bandwidth than the residential telephone line 16 to decrease the transmission time.

The video system 12 shown in FIG. 2 includes a laser disc 24 for storing one or more substitute television programs such as a commercial. The commercial is pre-recorded on the laser disc 24 which is periodically delivered by hand or by mail to a panelist's home. A controller 26 having a central processing unit 28 is responsive to instructions stored in a memory 30 for reading a particular substitute television program out from the laser disc 24 so that the substitute television program may be televised on a television 32 as discussed in detail below. An input device 33 such as a keyboard is coupled to the controller 26 to allow a panelist to enter market research data such as answers to market research questions displayed on the television 32 under the control of the controller 26. The input device 33 may also include a scanning wand to identify products purchased by the panelist. Market research data entered by a panelist using the input device 33 is stored under the control of the controller 26 in a data memory 34. Other market research data such as the on-off condition of the television 32 and the identity of the television channels viewed, as detected by a conventional channel detector cable 36, are also stored by the controller 26 in the data memory 34.

At preprogrammed times, such as each night, the controller 26 causes a modem 38 having an automatic dialer to automatically dial the local office 14 to transmit the market research data stored in the data memory 34 to the central office 20 through the communication networks 16 and 22 and the multiplexer 18 of the local office 14. When communication is thus established between the panelist's home 10 and the central office 20, the central office 20 transmits via the communication networks 16 and 22 and the multiplexer 18, instructions for the controller 26. The instructions from the central office 20 are coupled to the memory 30 of the controller 26 through the modem 38 and a separator 40 that includes buffer amplifiers an the like to isolate the controller 26, data memory 34 and the modem 38 and to maintain the strength of the signals coupled thereby. The instructions transmitted from the central office 20 to the controller 26 include the identification codes of regularly scheduled television programs to be substituted for and the identity of the substitute television programs stored in the laser disc 24.

The video substitution system 12 includes an antenna 42 for receiving normal over-the-air broadcast television programs. To receive cable television programs, the antenna 42 may be replaced by a conventional cable television signal distribution cable. The antenna 42 is coupled to a demodulator/down converter 44 that down converts the frequency of the received television program to base band wherein the controller 26 sets the frequency of the demodulator/down converter 44 to the frequency of the channel to which the television 32 is tuned as detected by the channel detector cable 36. The demodulator/down converter 44 also separates the audio and video portions of the received television program, the video portion being coupled to an analog-to-digital converter 46 as well as to a Back Porch Detector 50 and the audio portion of the television program being coupled to an analog-to-digital converter 48. The detector 50 detects the back porch period 55 for each horizontal line of video information as well as whether the received video signal is associated with an odd field or an even field of video information to allow the controller 26 to detect an identification code, if any, encoded in the video portion of the received television program.

Figure 4:
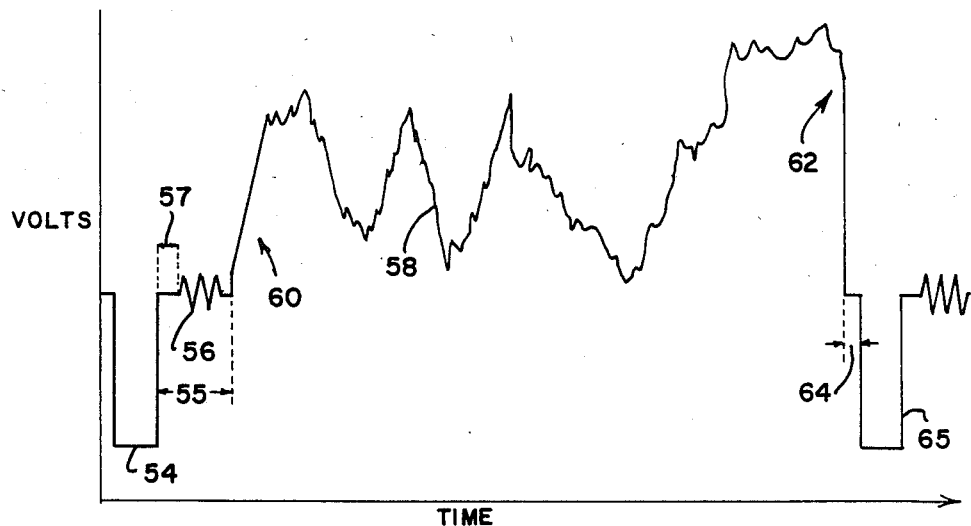
FIG. 4 is a graph illustrating a horizontal line of analog video information.

The video portion of a television program includes a number of frames, each frame having an odd and an even field wherein each of the fields has 262.5 horizontal lines. As shown in FIG. 4, a horizontal line of video information includes a horizontal synchronization pulse 54 followed the back porch period 55 that includes a breezeway 57 followed by a color burst signal 56. The back porch period 55 is followed by the active line period 58 that includes the video information, specifically the luminensce and chroma information for one horizontal line of video wherein the active line period 58 begins 4.83 microseconds after the leading edge of the horizontal synchronization pulse 54. The identification code is encoded in the active line period 58 in either the leading overscan portion 60 or the trailing overscan portion 62 thereof. The overscan portions 60 and 62 are those portions of the active line period 58 that extend beyond the visible portion of a television screen, on the right and left sides thereof. Although the length of the overscan portions 60 and 62 is variable, being dependent upon the tuning of the television 32, each overscan portion 60 and 62 typically constitutes 57.5% of the active line period 58. More specifically, the leading overscan portion 60 typically constitutes 5-7.5% of the active line period 58 and begins immediately following the back poorch 55; whereas the trailing overscan portion 62 typically constitutes 15% of the active line period 58 immediately preceeding a front porch 64 associated with the next horizontal synchronization pulse 65. Preferably, the identification code is encoded in whole or in part in the leading overscan portion 60 since the beginning of the portion 60 of the active line period 58 is easier to detect than the beginning of the trailing overscan portion 62.

The identification code encoded in the leading overscan portion 60 of the active line period 58 for a television commercial preferably includes a client identification number, a product identification number, a test number, a version number, a market number, frame and field numbers, and a Cyclic Redundancy Check (CRC) code. In order to provide the system of the present invention to a large number of clients having a large number of products for which it is desirable to test commercials, three bytes of code information are used to encode the client number, product identification number, test number and version number. Two bytes of code information define the market number and two more bytes define the frame and field numbers. Two bytes o code information also define the CRC code. This nine bytes of code information forms the identification code for a television commercial. The information defined by the identification code and the size of the identification code may vary depending on the applications of the system of the present invention. However, for the purposes of the following discussions, a nine byte identification code is used wherein the first three bytes of code information identify the client number, product identification number, test number and version number; the fourth and fifth bytes of the identification code identify the market number; the sixth and seventh bytes of the identification code identify the frame and field numbers and the eighth and ninth bytes identify the CRC code.

The entire identification code may be encoded in one horizontal line of video information wherein one bit of the identification code is defined by one bit of digital video information. However, to ensure that the identification code is not impaired by the black level, at which the broadcasting station transmits the regularly scheduled television commercial, the following encoding scheme is preferably utilized.

In the preferred encoding scheme the digital representations of four pixels such as the first four pixels in the leading overscan portion 60 of each horizontal line of video information are used to define one bit of code information. Each pixel has an 8-bit or one byte digital representation so that 32 bits of digital video information per horizontal line define one bit of code information. A "1" bit of code information is defined by the digital representations of two black pixels in series followed by two white pixels in series; wherein, a "0" bit of code information is defined by the digital representations of two white pixels in series followed by two black pixels in series. Because an identification code requires nine bytes of code information and each horizontal line defines one bit of code information, four pixels in each of 72 horizontal lines of video information are required to encode the identification code. For redundancy, the identification code may be repeated three times per field since there are 262.5 horizontal lines per field.

Figure 3:
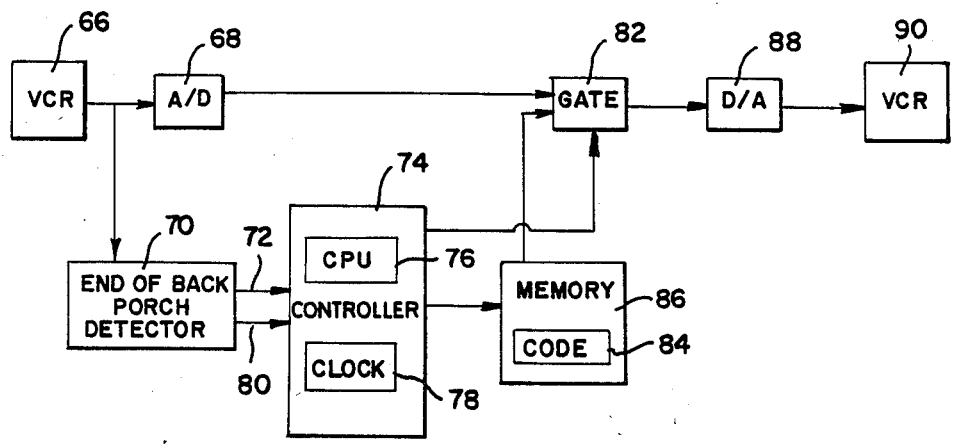
FIG. 3 is a block diagram of the identification code encoder.

The nine byte identification code is encoded on a television program such as a commercial by the encoding system of FIG. 3. The encoding system of FIG. 3 includes a video cassette recorder 66 that plays a television commercial, that is to be encoded so that the commercial may later be selectively substituted for by the video substitution system 12. The output of the video cassette recorder 66 is coupled to an analog-to-digital converter 68 and to a Back Porch Detector 70. The Back Porch detector 70 is responsive to the analog output of the video cassette recorder 66 to identify the back porch period 55 of each horizontal line of video information so that an identification code or a portion thereof may be encoded in the leading overscan portion 60 of the active line period 58. The Back Porch Detector 70 may include, for example, a video synch separator such as the LM1881 Video Synch Separator manufactured by the National Semiconductor Corporation and configured to detect the back porch 55 so as to provide a signal representative thereof on a line 72 to a controller 74. The Back Porch Detector 70 is also preferably configured to provide an output signal on a line 80 to the controller 74 identifying each field of video information as an odd field or an even field. The controller 74 includes a central processing unit 76 and a clock 78. The controller 74 is responsive to the outputs on lines 72 and 80 from the Back Porch Detector 70 to control a gate 82 to couple substitute digital code information 84 stored in a memory 86 to a digital-to-analog converter 88 to substitute the code information 84 for the video information that appears in the leading overscan portion 60 of the active line period 58 of each horizontal line to be encoded. In the preferred embodiment, the identification code is encoded only in the odd field of each frame with the identification code being repeated three times in the odd field for redundancy. For the nine byte identification code discussed above, the controller 74 is responsive to an odd field signal on line 80 from the detector 70 and the end of the back porch signal output from the detector 70 on line 72 to actuate the gate 82 to cause 32 bits defining four pixels from the memory 86 to be coupled through the gate 82 to a digital-to-analog converter 88 to encode one bit of the identification code in the leading overscan portion 60. After the 32 bits defining one bit of the identification code are coupled to the digital-to-analog converter 88 through the gate 82, the controller 74 controls the gate 82 to couple the output of the analog-to-digital converter 68 to the digital-to-analog converter 88 so that the remainder of the video information contained in the active line period 58 is converted back to analog form and recorded with the analog representation of the one bit of code information by a second video cassette recorder 90. The controller 74 repeats this process to encode 32 bits of video information in the leading overscan portion 60 of the active line period 58 for 72 horizontal lines to encode the nine byte identification code once. Thereafter, the controller 74 encodes lines 73–144 and lines 145–216 of the odd field with the same identification code so that the code is encoded three times per frame for redundancy.

Returning to the substitution system shown in FIG. 2, the Back Porch Detector 50, as discussed above, is responsive to the video portion of the output from the demodulator/down converter 44 to detect the back porch period 55 for each horizontal line of video information received as well as detecting whether the received video information is associated with an odd field or an even field The Back Porch Detector 50 may be configured similarly to the Back Porch Detector 70 shown in FIG. 3 so as to include an LM1881 Video Synch Separator manufactured by the National Semiconductor Corporation and configured to provide a signal on a line 92 identifying the back porch period 55 and to provide an output signal on a line 94 to identify whether the signal coupled to the analog-to-digital converter 46 is associated with an odd or an even field of video information. The controller 26 is responsive to the outputs from the detector 50 on lines 92 and 94 to sense from the output of the analog-to-digital converter 46 an identification code, if any, encoded in the video portion of a received television program.

The controller 26 senses an encoded identification code as follows with reference to the flow chart of FIG. 8. At a block 100, the controller 26 determines whether an odd field of video information is being coupled from the demodulator/down converter 44 to the analog-to-digital converter 46. If an odd field is detected by the detector 50 as signaled on line 94, the controller 26 at block 102 sets N=1 and X=1. Thereafter, at block 104, the controller 26 determines the end of the back porch 55 from the back porch signal on line 92. When the controller 26 senses the end of the back porch signal 55 on line 92, the controller 25 at block 106 reads the first 32 bits of information in the active line period of a horizontal line of video information output from the analog-to-digital converter 46. At block 108, the controller 26 determines whether the first 16 bits of video information define two black pixels or two grey pixels of the same shade and among the four closest shades of grey to black. The controller makes this comparison to substantially eliminate the effect of variations in the black level at which the received television commercial was transmitted. More particularly, there are 17 shades of grey between white and black for a typical television. To ensure that a black pixel is detected as black even if the black level of the transmission corresponds to a shade of grey close to black, the controller 26 determines if the digital representations of the first two pixels, i.e., the first 16 bits of video information, define two pixels having the same shade of grey that is among the four closest shades of grey to black. Similarly, the controller 26 determines whether the digital representations of two pixels define two pixels having the same shade of grey that is among the four closest shades of grey to white to ensure that white pixels are properly detected.

Returning to FIG. 8, if the controller 26 makes a yes determination at block 108, the controller 26 proceeds to block 110 to determine whether the next 16 bits of video information define two white pixels or two grey pixels of the same shade among the four closest shades of grey to white. If they do, the controller 26 at block 112 stores a "1" for the Nth bit. If the controller 26 at block 108 determines that the first 16 bits do not define two black pixels or two grey pixels of the same shade and among the four closest shades of grey to black, the controller 26 at block 114 determines whether the first 16 bits of video information define two white pixels or two grey pixels of the same shade and among the four closest shades of grey to white. If so, the controller 26 proceeds to block 116 to determine whether the next 16 bits of video information define two black pixels or two grey pixels of the same shade and among the four closest shades of grey to white. If so, the controller 26 at block 118 stores a "0" for the Nth bit. If the first 16 bits of video information do not define either two black pixels, two white pixels or grey pixels of the four closest shades of grey to black or white the controller 26 does not store any information for the Nth bit. Similarly, if the second group of 16 bits of video information does not define either two white pixels, two black pixels or two grey pixels of the same shade and among the four closest shades of grey to white or black as determined by blocks 110 and 116, the controller 26 does not store any information for the Nth bit.

After identifying the first 32 bits of information as a "1" bit of code information or a "0" bit of code information or as unrecognizable, the controller 26 proceeds to block 120 to increment N to N=N+1. Thereafter, at block 122 the controller determines whether N=72. If the controller determines that N=72, the controller 26 at block 124 sets for the first code (X=1): the client number, product identification number, test number and version number to bits 1–24; the market number to bits 25–40; the frame and field numbers to bits 41–56 and the CRC code to bits 57–72. At block 124, the controller 26 further increments X to X=X+1 and sets N=1. Thereafter, at block 126 the controller 26 determines whether X is equal to 4. If not, the controller 26 at block 128 determines from the Back Porch Detector 50 whether the back porch 55 of the next horizontal line associated with the odd field is detected and if so returns to block 104 to read the identification code encoded on lines 73 to 144 of the odd field. The controller 26 repeats the process a third time to sense the identification code encoded on lines 145–216 of the odd field after which X will be set to 4 at block 124. At block 126, when the controller 26 determines that X is equal to 4 the controller 26 proceeds to block 130 to perform a redundancy check wherein the first, second and third codes are compared to determine whether the identification codes sensed are the same. If, for example, the identification code sensed is the same two out of three times, the controller 26 sets the detected identification code of the received television program to the identification code that is repeated twice.

Returning to FIG. 2, after detecting an identification code encoded in an odd field of a frame of video information, the controller 26 determines from the instructions stored in its memory 30 whether the detected identification code is associated with a television program that is to be substituted for. If the identified television program is not to be substituted for, the controller 26 allows the digital video information coupled to a gate 136 through a delay 140 and the digital audio information coupled to a gate 142 through a delay 144 to pass to respective digital-to-analog converters 146 and 148. The outputs of the digital-to-analog converters 146 and 148 are thereafter coupled to a modulator 150. The modulator 150 is tuned to the frequency of the channel to which the television 32 is set to reconstruct the regularly scheduled television commercial so as to couple the reconstructed television commercial with video and audio to the television 32 so that the regularly scheduled television commercial may be displayed on the cathode ray tube display 31.

If, however, the controller 26 determines that the detected identification code identifies a television program that is to be substituted for according to the instructions stored in the memory 30, the controller 26 addresses the appropriate substitute television program stored on the laser disc 24 to cause the video portion and the audio portion of the substitute television program to be read out from the laser disc 24 and to be applied to the respective gates 136 and 142. The controller 26 controls the gates 136 and 142 by control signals on respective lines 152 and 154 to couple the video and audio information from the laser disc 24 to the respective digital-to-analog converters 146 and 148 instead of coupling the delayed video and audio portions of the regularly scheduled television commercial output from the respective delays 140 and 144. From the outputs of the digital-to-analog converters 146 and 148 the substitute audio and video signals are applied to the television 32 through the modulator 150. The controller 26 thereby substitutes a television program stored on the laser disc 24 for a television program received by the antenna 42 for display on the cathode ray tube display 31 of the television 32.

The gates 136 and 142 may be formed of diode switches or the like which are responsive to a computer control signal such as provided on lines 152 and 154 to gate digital information received on one of two input lines, out to the respective digital-to-analog converters 146 and 148. The delays 140 and 144 are provided to allow the controller 26 to detect an identification code encoded on a received television program and to determine whether the detected identification code is associated with a television program that is to be substituted for by a television program stored on the video disc 24. This delay is very short, such as less than 1 or 2 seconds, so as to be undiscernible by a viewer.

The television program substitution system 12 as shown in FIG. 2 allows any television program encoded with an identification code to be substituted for by a television program stored on the laser disc 24 so that market research information regarding the substitute commercial may be collected such as via the user input device 33. For example, the market research data might identify whether the product that is the subject of the substitute commercial is bought by the cooperating panelist as sensed by the scanning wand included in the user input device 33. Alternatively, or in addition thereto, the market research data collected might include answers, input to the controller 26 using the keyboard of the user input device 33, wherein the questions may be displayed on the television 32 under the control of the controller 26 in accordance with data and instructions stored in the memory 30, as well known.

The television program substitution system 12 of the present invention, as shown in FIG. 2, is inobtrusive in that a cooperating panelist is unaware that he is viewing a substitute television commercial or a regularly scheduled television commercial. The viewer cannot see an identification code encoded in a regularly scheduled television commercial because the code is encoded in the overscan portion 60 and further, the interleaving of the odd and even fields tends to mask the code so it is not discernable to the human eye. Further, because the identification code encoded in each odd field of each frame of a television commercial to be substituted for includes the frame and field number, the controller 26 can cause the substitute video information stored in the laser disc 24 and having the same field number and frame number to be coupled to the television 32 instead. More particularly, if a panelist turns on the television 32 in the middle of a broadcast commercial to be substituted for, the controller 26, in response to an "On signal" from the cable 36, senses the frame and field number of the broadcast commercial received at the time that the television 32 is turned on so as to cause the video information of the substitute television commercial stored in the video disc 24 with the same field number and frame number to be applied to the gates 136 and 142 so that the panelist will view the same portion of the substitute television commercial as he would have viewed of the received broadcast commercial.

The television program substitution system depicted in FIG. 5 is the same as the substitution system depicted in FIG. 2 except that a mass storage random access memory, the DRAM 160 is employed instead of the video disc 24. The DRAM 160 enables a substitute television commercial to be transmitted from the central office 20 to the substitution system 12 shown in FIG. 5. More particularly, when communication is established between the panelist's home 10 and the central office 20 as discussed above, after transmitting instructions to the video substitution system 12, a main frame computer 164 causes a substitute television program stored in digital form on a digital tape or disc storage device 166 to be transmitted to the local office 14 via a high speed modem 168 and the broadband communication network 22. Thereafter, the multiplexer 18 of the local office 14 transmits the substitute television program over the standard residential phone line 16 to the modem 38 of the video substitution system 12. Upon receipt of a substitute television program from the central office 20, the controller 26 controls the separator 40 via a line 165 to route the transmitted substitute television program from the modem 38 to line 162 and the DRAM 160. The substitute television program is stored in the DRAM 160 for subsequent display on the television 32 as discussed above with reference to FIGS. 2 and 8.

The system depicted in FIGS. 1 and 5 allows a substitute television program such as a commercial to be downloaded from the central office 20 into particular panelist's homes 10 at night when the telephone lines of the panelist's home are not in use to provide a fully automated system. Because the amount of time necessary to transmit a typical television commercial in digital form over standard residential telephone lines such as the communication network 16 may be long, the substitute television commercial or television program may be stored in the storage device 166 at the central office 20 in compacted form. The substitute commercial is transmitted in a form as compacted by the system depicted in FIG. 6 so as to reduce the time necessary to transmit the substitute television commercial to the panelist's home 10. In order to substitute a television program transmitted to the panelist's home 10 in compacted form, the substitution system depicted in FIG. 5 is modified to include a microprocessor based DRAM controller 172 as shown in FIG. 7 and as described in detail below.

The system for compressing a substitute television program as shown in FIG. 6, compresses the video portion of the television program. The audio portion of the substitute television program may also be compressed, if desired, according to standard audio compression techniques. As shown in FIG. 6, a video cassette recorder 180 plays a substitute television program wherein the video portion of the program is coupled on a line 181 to an analog-to-digital converter 182. The audio portion of the substitute television program is coupled to an analog-to-digital converter 187 on a line 185. The clock of the CPU 184 forms a master clock controlling the timing of the A/D converters 182 and 187. The digital representation of the audio portion of the substitute television program is stored under the control of a controller 183 in the storage device 166 in an area thereof designated for audio storage. The digital representation of the video portion of the substitute television program, however, is compressed by a central processing unit 184 of the controller 183 according to a compression routine stored in a memory 186 of the controller 183. After being compressed, the video portion is stored in an area of the storage device 166 designated for video storage under the control of the controller 183.

To compress the video portion of the substitute television program, the controller 183 stores, in the memory 186, the first frame of video information for the substitute television program and stores for subsequent frames, only that video information representing a change from the video information stored for a previous frame. In one embodiment of the compression routine as depicted in FIG. 9, the video change information stored in the memory 186 represents the differences between each frame in one scene and the first frame of that scene. In a second embodiment of the compression routine as depicted in FIG. 11, the video change information stored in the memory 186 represents the differences between each frame and the immediately preceding frame.

According to the first embodiment of the compression routine depicted in FIG. 9, the controller 183 at a block 200 sets a variable, Y, equal to 1. The controller 183, at a block 202 then stores the first and second (odd and even) fields of the first frame of the first scene of the substitute television program. Thereafter, at a block 204 the controller 183 sets a variable X equal to 2 and a block 206 sets a variable N equal to 1 and a variable Z equal to 1 wherein N represents a line number, Z represents a field number, X represents a frame number and Y represents a scene number. After initializing the variables Y, X, N and Z at blocks 200, 204 and 206, the controller 183 at a block 208 determines whether the Nth line of frame X, scene Y is different from the Nth line of the first frame of scene Y. If it is not different, the controller 183 at block 210 stores a beginning code and an end code of line N for frame X, field Z, and scene Y. If, however, a difference is detected at block 208, the controller 183 at block 212 determines whether the change is greater than a threshold change. The threshold change represents a change greater than that caused by unintentional vibration of the movie camera recording the television program. If the change is greater than the threshold change as determined by the controller 183 at block 212, the controller 183 at a block 214 stores the beginning code for line N; the location of the changed pixels and the video information for each changed pixel in line N; the end code of line N for frame X, field Z and scene Y. From blocks 210 or 214, the controller 183 then sets the line number N equal to N+2 at a block 216.

At a block 218 the controller 183 determines whether the line number N is equal to 526 and at block 220 the controller 183 determines whether the line number N is equal to 527 to respectively determine whether all of the lines of the even field and all of the lines of the odd field of frame X have been compressed. Since N is initially set to one at block 206, the controller 183 first compresses the lines of the first or odd field of a frame. When the lines of the odd field of a frame have all been compressed, N will be equal to 527 as set at block 216 since there are 525 horizontal lines in one frame. When the controller 183 determines at block 220 that N=527, the controller 183 at a block 222 sets the line number N equal to 2, the field number Z equal to 2 and returns to block 208 to compress the second or even field of frame X. After compressing the video information for each of the lines of the even field, the line number N will be set equal to 526 at block 216. When the controller 183 determines that N=526 at block 218, the controller 183 at block 224 sets the frame number X equal to X+1. Thereafter, at a block 226, the controller 183 determines whether the frame number X is greater than the number of frames in scene Y. If not, the controller 183 returns to block 206 from block 226 to compress the video information for the next frame of scene Y. If, however, the controller 183 determines at block 226 that the frame number X is greater than the number of frames in the scene Y, the controller 183 proceeds to a block 228 to record the data stored for scene Y on the digital storage device 166. Thereafter, at a block 230, the controller 183 increments the scene number Y by one. At a block 232 the controller 183 determines whether the scene number Y is greater than the number of scenes in the commercial or television program being compressed and if it is, the controller 183 exits the routine. If the incremented scene number Y is less than or equal to the number of scenes in the commercial or television program being compressed as determined by the controller 183 at block 232, the controller 183 returns to block 206 to compress the video information for each frame of scene Y.

The video substitution system depicted in FIG. 7 for substituting a television commercial stored in the DRAM 160 and compressed according to the compression routine depicted in FIG. 9 operates as follows with reference to FIG. 10. Upon detecting an identification code of a received broadcast television commercial that identifies the television commercial as one to be substituted for, the controller 26 controls the DRAM controller 172 to read out to the gate 136, in expanded form, the video data stored in the DRAM 160 for the television commercial that is to substitute for the received television commercial. In order to do so, the DRAM controller 172 at block 240 of FIG. 10 first sets the scene number Y equal to one. Thereafter, at block 242, the DRAM controller 172 copies the pixel data stored for the first field of the first frame for scene Y from the DRAM 160 to the gate 136. At a block 246, the DRAM controller 172 copies the pixel data stored in the DRAM 160 for the second or even field of frame 1, scene number Y to the gate 136. Thereafter, at a block 248, the D-AM controller 172 sets the frame number X equal to 2. At block 250, the DRAM controller 172 sets the line number N equal to 1 and the field number Z equal to 1 to initialize the expansion routine to read out to the gate 136 the expanded video data for the first line of the first or odd field of the second frame of scene number Y. At a block 252, the DRAM controller 172 determines whether there is any pixel change data stored for line N, frame X, scene Y. If not, the DRAM controller 172 at block 254 copies the data stored for the Nth line of frame 1, field Z, scene Y to the gate 136 during the horizontal blanking interval preceding line N. If, however, pixel change data is stored for the Nth line of frame field X, Z, and scene Y as determined by the DRAM controller 172 at block 252, the DRAM controller 172 at a block 256 copies line N of the first frame, field Z, scene Y to the switch substituting the stored pixel change data at the identified location of the pixel change in line N during the horizontal blanking interval preceding line N. Thereafter, at a block 258, the DRAM controller 172 sets the line number N equal to N+2 to increment the line number to the next line of the field number Z. At block 260 the DRAM controller 172 determines whether the line number N is equal to 526 and if not, the DRAM controller 172 determines at block 262 whether the line number N is equal to 527. If the line number N is determined to be equal to 527, such that the all of the lines for the first or odd frame have been applied to the gate 136, the DRAM controller 172 at a block 263 sets N equal to 2, Z equal to 2 and returns to block 252 in order to read out to the gate 136 the expanded video data for the even field of frame number X. If the DRAM controller 172 determines at block 260 that N is equal to 526 such that the video data stored in compressed form in the DRAM 160 has been read out by the controller 172 in expanded form to the gate 136 for both the odd and even fields of frame number X, the DRAM controller 172 at a block 264 increments the frame number X by 1. Thereafter, at a block 266, the DRAM controller 172 determines whether the frame number X is greater than the number of frames in scene Y. If not, the DRAM controller 172 returns to block 250. If, however, the frame number X is greater than the number of frames in scene Y, the DRAM controller 172 proceeds from block 266 to a block 268 to increment the scene number Y by one. Thereafter, at a block 270, the DRAM controller 172 determines whether the scene number Y is greater than the number of scenes stored for the substitute television commercial or program. If so, the DRAM controller 172 exits the expansion routine depicted in FIG. 10 at block 272. If, however, the scene number Y is less than or equal to the number of scenes in the substitute commercial, the DRAM controller 172 returns to block 242 to read out the data stored in the DRAM 160 in expanded form to the gate 136 for the next scene.

In the second embodiment of the substitute television program compression routine depicted in FIG. 11, the controller 183 as shown in FIG. 6 utilizes an image memory 188 that forms a dedicated portion of the memory 186 to compress the video portion of a substitute television program. The controller also utilizes a portion 189 of the memory 186 for storing data to be recorded. In this embodiment, the video change information stored for each frame represents the differences between each frame and the immediately preceding frame. More particularly, according to the second embodiment of the compression routine as depicted in FIG. 11, the controller 183, at a block 280 stores the video information for the first and second fields (odd and even fields) of the first frame of a substitute television program in the image memory 188 and in the memory portion 189. Thereafter, at a block 282, the controller 183 sets the frame number X equal to 2 and at a block 284 sets the line number N equal to 1 and the field number Z equal to 1. The controller 183 at a block 286 then determines whether line N of frame X is different from line N stored in the image memory 188. If it is not, the controller 183 proceeds to block 288 and stores the beginning and end codes for line N, frame X, field Z for recording in the memory 186. The controller 183 then proceeds to block 296. If, however, the controller 183 determines at block 286 that line N of frame X is different from line N stored in the image memory, the controller 183 at block 290 determines whether the change is greater than a threshold change. If the change is greater than a threshold change, the controller 183 proceeds to block 292 and stores the beginning code for line N; the location of the changed pixels as well as the video change information; and the end code for line N, frame X and field Z in the recording portion 189 of the memory 186. Thereafter, at block 294, the controller 183 changes line N in the image memory 188 to correspond to line N of frame X. At block 296 the controller 183 increments the line number N by 2 to the next line number of the field Z. At block 298 the controller determines whether N is equal to 526 and if not, the controller 183 determines at a block 300 whether N is equal to 527. If the controller determines at block 300 that N is equal to 527, such that the video information for each line of the first or odd field of frame X has been stored in the memory portion 189 for recording, the controller 183 at a block 302 increments the line number N to N=2 and the field number Z to Z=2 so that the even field of frame number X may be compressed and stored for recording in the memory portion 189. From block 302, the controller 183 proceeds to block 286 to compress the video information for the even field of frame X. After the controller 183 compresses the video information for the even field of frame X such that the line number N is equal to 526, the controller proceeds to block 304 from block 298 to increment the frame number X by 1. Thereafter, at a block 306, the controller 183 determines whether the frame number X is greater than the number of frames in the commercial or television program being compressed. If not, the controller 183 returns to block 284 to compress first the odd field and then the even field of the next frame. If, however, the controller 183 determines at block 306 that the frame number X is greater than the number of frames in the commercial being compressed, the controller 183 at a block 308 records the data stored in the memory portion 189 in the storage device 166 and exits the compression routine of FIG. 11 at block 310. It is noted that instead of utilizing the memory portion 189 to store the data prior to recording, the controller 183, at blocks 288 and 292, may cause the video data for the horizontal line being compressed to be recorded in the storage device 166.

In order to substitute a television commercial or program compressed according to the routine depicted in FIG. 11, the substitution system shown in FIG. 7 dedicates a portion of the DRAM 160 to an image memory 174 that forms a working memory for the DRAM controller 172 wherein the data expanded in the image memory 174 provides an image of each frame to be displayed on the cathode ray tube display 31 of the television 32. The controller 172 reads out the expanded data from the image memory 174 directly to the gate 136. More particularly, when the controller 26 determines that a broadcast commercial is received that is to be substituted for by a television commercial stored in the DRAM 160 as compressed according to the routine depicted in FIG. 11, the controller 26 signals the DRAM controller 172 to read out the substitute television program to the gate 136 as follows. The DRAM controller 172 at block 320 first stores the pixel data for the first and second (odd and even) fields of frame one in the image memory 174. Thereafter, the DRAM controller 172 at a block 322 copies the pixel data for the first or odd field of the first frame to the gate 136. Next, at a block 324, the DRAM controller 172 copies the pixel data for the second or even field of the first frame to the gate 36. At block 326 the DRAM controller 172 sets the frame number X equal to 2 and at block 328 sets the line number N equal to 1 and the field number Z equal to 1. Thereafter, at block 330, the DRAM controller 172 determines whether there is any pixel change data stored for the Nth line of frame X in the DRAM 160. If not, the DRAM controller 172 proceeds to block 334. If, however, pixel change data is stored in the DRAM 160 for the Nth line of frame X, the DRAM controller 172 proceeds to block 332 to change line N in the image memory 174 according to the pixel change data stored for line N in the DRAM 160. Thereafter, at block 334, the DRAM controller 172 copies line N from the image memory to the gate 136 during the horizontal blanking interval preceding the display of line N. At a block 336, the DRAM controller 172 sets the line number N equal to N+2 so as to increment the line number N to the next line of field Z for frame X. At block 338 the DRAM controller 172 determines whether the line number N is equal to 526 and if not, the DRAM controller 172 determines at block 340 whether the line number N is equal to 527. If N equals 527 such that all of the lines for the first or odd field of frame number X have been read out from the image memory 174 to the gate 136, the DRAM controller 172, at block 342, sets the line number N equal to 2, the field number Z equal to 2 and proceeds to block 330 to form in the image memory 174 an image of the video information for the second or even field of frame number X while reading out the video information stored in the image memory 174 to the gate 136. If, the DRAM controller 172 determines at block 338 that N is equal to 526 such that each line of the second or even field of frame X has been read out to the gate 136, the DRAM controller 172 proceeds to block 344 to increment the frame number X by 1. Thereafter, at block 346 the DRAM controller 172 determines whether the frame number X is greater than the number of frames in the substitute commercial stored in the DRAM 160. If not, the DRAM controller 172 proceeds from block 346 to block 328 to expand the data stored for the first or odd field of the next frame and, thereafter, the video information stored for the even field of the next frame to read the data out to the gate 136. If, however, the frame number X is greater than the number of frames in the commercial the DRAM controller 172 exits the expansion routine depicted in FIG. 12 at a block 348.

Many modifications and variations of the present invention are possible in light of the above teachings. Thus, it is to be understood that, within the scope of the appended claims, the invention may be practiced otherwise than as discussed hereinabove.

What is claimed and desired to be secured by Letters Patent is:

1. A system for substituting on a television in a household a stored television program for a scheduled television program having an identification code, comprising, at the household:
   means for receiving a scheduled television program;
   means for storing a substitute television program;
   means for detecting an identification code of a scheduled television program; and
   means for selectively coupling a stored television program or a scheduled television program to said television, said coupling means being responsive to the detection of a predetermined identification code of a scheduled television program to couple said stored substitute television program to said television from said storing means.

2. A system for substituting a stored television program for a scheduled television program as recited in claim 1 wherein said storing means includes a laser disc.

3. A system for substituting a stored television program for a scheduled television program as recited in claim 1 wherein said storing means includes a dynamic random access memory.

4. A system for substituting a stored television program for a scheduled television program as recited in claim 1 wherein said coupling means includes means for storing the identification code of a scheduled television program to be substituted; and means for comparing a detected identification code to said stored identification code, said coupling means being responsive to said comparing means for coupling said stored substitute television program to said television when said detected identification code equals said stored identification code.

5. A system for substituting a stored television program for a scheduled television program as recited in claim 1 wherein said television programs include video information having a plurality of frames, each frame having a plurality of horizontal lines and each line having an active line period, said identification code being encoded in the active line period of a horizontal line of video information for a scheduled television program.

6. A system for substituting a stored television program for a scheduled television program as recited in claim 5 wherein each horizontal line includes a back porch period prior to the active line period, said code detecting means including:
   means for detecting a back porch period; and
   means responsive to said back porch detecting means for sensing at a predetermined time, a predetermined amount of information in a horizontal line of video information of a scheduled television program to detect said identification code.

7. A system for substituting a stored television program for a scheduled television program as recited in claim 5 wherein each frame of said video information has an associated frame number and said identification code is encoded in a horizontal line of each frame of said video broadcast information and includes for each frame it's associated frame number.

8. A system for substituting a stored television program for a scheduled television program as recited in claim 7 wherein said coupling means is responsive to the identification code of a frame of video information of a scheduled television program to substitute for said frame of video information a frame of stored video information having a frame number corresponding to the frame number of the frame of video information of said scheduled television program.

9. A system for substituting a stored television program for a scheduled television program as recited in claim 5 wherein said identification code is encoded in the leading overscan portion of the active line period of a horizontal line of video information.

10. A system for substituting a stored television program for a scheduled television program as recited in claim 9 wherein said entire identification code is encoded in said leading overscan portion of said active line period of a horizontal line of video information.

11. A system for substituting a stored television program for a scheduled television program as recited in claim 10 wherein said identification code is encoded in multiple horizontal lines of a frame of video information.

12. A system for substituting a stored television program for a scheduled television program as recited in claim 9 wherein only a portion of an identification code is encoded in a horizontal line of video information.

13. A system for substituting a stored television program for a scheduled television program as recited in claim 12 wherein said identification code includes a plurality of bits of code information and one bit of said code information is encoded in a horizontal line of video information.

14. A system for substituting a stored television program for a scheduled television program as recited in claim 13 wherein the active line period of each horizontal line of video information represents a plurality of pixels and each bit of code information is defined by the digital representations of a predetermined number of pixels in the leading overscan portion of said active line period of a horizontal line of video information.

15. A system for substituting a stored television program for a scheduled television program as recited in claim 14 wherein said identification code is encoded multiple times in each frame of video information of said scheduled television program.

16. A system for substituting a stored television program for a scheduled television program as recited in claim 1 wherein said control means further includes means for collecting marketing research data.

17. A system for substituting a stored television program for a scheduled television program as recited in claim 16 wherein said collecting means includes means operable by a panelist for entering marketing research data; and means for storing marketing research data.

18. A system for substituting a stored television program for a scheduled television program as recited in claim 1 wherein said television programs include video and audio information and said selective coupling means includes:
   means coupled to said receiving means and to said storing means for gating the video and audio information of either a scheduled television program or a substitute television program to said television; and
   means responsive to the detection of a predetermined identification code of a scheduled television program for controlling said gating means to gate said substitute television program to said television.

19. A system for substituting a stored television program for a scheduled television program as recited in claim 18 wherein said storing means stores said substitute video information in compressed form and said control means includes means for expanding said stored substitute video information to couple expanded substitute video information to said television in response to the detection of a predetermined identification code.

20. A system for substituting a stored television program for a scheduled television program as recited in claim 19 wherein said video information includes a plurality of frames, each frame having a plurality of lines, the video information for the first frame of said substitute video information being stored in said storing means and for subsequent frames of said substitute video information, only the video information representing a change from the video information stored for a previous frame being stored in said storing means.

21. A system for substituting a stored television program for a scheduled television program as recited in claim 20 wherein said storing means stores for each line of said frame a beginning code, video change information if any, the location of said video change information and an end code.

22. A system for substituting a stored television program for a scheduled television program as recited in claim 20 wherein said video change information stored in said storing means for a frame subsequent to said first frame represents the differences between said subsequent frame and said first frame.

23. A system for substituting a stored television program for a scheduled television program as recited in claim 20 wherein said video change information stored in said storing means for each frame subsequent to said first frame represents the differences between each subsequent frame and the frame immediately preceding said subsequent frame.

24. A system for substituting a stored television program for a scheduled television program as recited in claim 23 wherein said expanding means includes:
   image memory means for storing an image of a frame of expanded substitute video information;
   means for copying said first frame of substitute video information from said storing means to said image memory means;

means for copying the video information stored in said image memory means to said gating means; and means for updating said image memory means with video change information stored for each subsequent frame after the video information for the preceding frame is copied to said gating means.

25. A system for substituting on a cathode ray tube display in a household a series of frames of stored video information for a series of frames of transmitted video information having an identification code, comprising, at the household:

means for receiving said transmitted video information;

means for storing a series of frames of substitute video information;

means for detecting an identification code of said transmitted video information; and means for selectively coupling said stored video information and said transmitted video information to said cathode ray tube display, said coupling means being responsive to the detection of a predetermined identification code of said transmitted video information to couple said stored video information to said television to substitute said stored video information for said transmitted video information.

26. A system for substituting stored video information for transmitted video information as recited in claim 25 wherein said video information includes a plurality of frames, each frame having a plurality of horizontal lines and each line having an active line period, said identification code being encoded in the active line period of a horizontal line of transmitted video information.

27. A system for substituting stored video information for transmitted video information as recited in claim 26 wherein each horizontal line includes a back porch period prior to the active line period, said code detecting means including:

means for detecting a back porch period; and means responsive to said back porch detecting means for sensing at a predetermined time, a predetermined amount of information in a horizontal line of transmitted video information to detect said identification code.

28. A system for substituting stored video information for transmitted video information as recited in claim 26 wherein each frame of said video information has an associated frame number and said identification code is encoded in a horizontal line of each frame of said transmitted video information and includes for each frame its associated frame number.

29. A system for substituting stored video information for transmitted video information as recited in claim 26 wherein said coupling means is responsive to the identification code of a frame of transmitted video information to substitute for said frame of transmitted video information a frame of stored video information having a frame number corresponding to the frame number of said frame of transmitted video information.

30. A system for substituting stored video information for transmitted video information as recited in claim 26 wherein said identification code is encoded in the leading overscan portion of the active line period of a horizontal line of transmitted video information.

31. A system for substituting stored video information for transmitted video information as recited in claim 30 wherein said entire identification code is encoded in said leading overscan portion of said active line period of a horizontal line of transmitted video information.

32. A system for substituting stored video information for transmitted video information as recited in claim 31 wherein said identification code is encoded in multiple horizontal lines of a frame of video information.

33. A system for substituting stored video information for transmitted video information as recited in claim 30 wherein only a portion of an identification code is encoded in a horizontal line of video information.

34. A system for substituting stored video information for transmitted video information as recited in claim 33 wherein said identification code includes a plurality of bits of code information and one bit of said code information is encoded in a horizontal line of video information.

35. A system for substituting stored video information for transmitted video information as recited in claim 34 wherein the active line period of each horizontal line of video information represents a plurality of pixels and each bit of code information is defined by the digital representations of a predetermined number of pixels in the leading overscan portion of said active line period of a horizontal line of video information.

36. A system for substituting stored video information for transmitted video information as recited in claim 33 wherein said identification code is encoded multiple times in each frame of video information of said scheduled television program.

37. A system for substituting stored video information for transmitted video information as recited in claim 25 wherein said selective coupling means includes:

means coupled to said receiving means and to said storing means for gating either the stored video information or the transmitted video information to said cathode ray tube display; and means responsive to the detection of a predetermined identification code of transmitted video information for controlling said gating means to gate said stored video information to said cathode ray tube display.

38. A system for substituting stored video information as recited in claim 37 wherein said storing means stores said substitute video information in compressed form and said control means includes means for expanding said stored substitute video information to couple expanded substitute video information to said television in response to the detection of a predetermined identification code.

39. A system for substituting stored video information as recited in claim 38 wherein said video information includes a plurality of frames, each frame having a plurality of lines, the video information for the first frame of said substitute video information being stored in said storing means and for subsequent frames of said substitute video information, only the video information representing a change from the video information stored for a previous frame being stored in said storing means.

40. A system for substituting stored video information as recited in claim 39 wherein said storing means stores for each line of said frame, a beginning code, video change information if any, the location of said video change information and an end code.

41. A system for substituting stored video information as recited in claim 39 wherein said video change information stored in said storing means for a frame subsequent to said first frame represents the differences between said subsequent frame and said first frame.

42. A system for substituting stored video information as recited in claim 39 wherein said video change information stored in said storing means for each frame subsequent to said first frame represents the differences between each subsequent frame and the frame immediately preceding said subsequent frame.

43. A system for substituting stored video information as recited in claim 42 wherein said expanding means includes:
  image memory means for storing an image of a frame of expanded substitute video information;
  means for copying said first frame of substitute video information from said storing means to said memory means;
  means for copying the video information stored in said image memory means to said gating means; and
  means for updating said image memory means with video change information stored for each subsequent frame after the video information for the preceding frame is copied to said gating means.

44. A system for substituting on a television a television program transmitted over a telephone line for a scheduled television program having an identification code, comprising:
  means for receiving a scheduled television program;
  means for interfacing with a telephone line to receive a substitute television program transmitted over said telephone line;
  means coupled to said interfacing means for storing said substitute television program;
  means for detecting an identification code of a scheduled television program;
  means coupled to said receiving means and said storing means for selectively coupling a scheduled television program or a stored television program to said television; and
  means responsive to said detecting means for controlling said coupling means to couple a substitute television program from said storing means to said television in response to the detection of a predetermined identification code.

45. A system for substituting a television program transmitted over a telephone line for a scheduled television program as recited in claim 44 wherein said storing means includes a laser disc.

46. A system for substituting a television program transmitted over a telephone line for a scheduled television program as recited in claim 44 wherein said storing means includes a dynamic random access memory.

47. A system for substituting a television program transmitted over a telephone line for a scheduled television program as recited in claim 44 wherein said coupling means includes means for storing the identification code of a scheduled television program to be substituted; and means for comparing a detected identification code to said stored identification code, said coupling means being responsive to said comparing means for coupling said stored substitute television program to said television when said detected identification code equals said stored identification code.

48. A system for substituting a stored television program for a scheduled television program as recited in claim 44 wherein said television programs include video information having a plurality of frames, each frame having a plurality of horizontal lines and each line having an active line period, said identification code being encoded in the active line period of a horizontal line of video information for a scheduled television program.

49. A system for substituting a stored television program for a scheduled television program as recited in claim 48 wherein said identification code is encoded in the leading overscan portion of the active line period of a horizontal line of video information.

50. A system for substituting a stored television program for a scheduled television program as recited in claim 49 wherein said entire identification code is encoded in said leading overscan portion of said active line period of a horizontal line of video information.

51. A system for substituting a stored television program for a scheduled television program as recited in claim 50 wherein said identification code is encoded in multiple horizontal lines of a frame of video information.

52. A system for substituting a stored television program for a scheduled television program as recited in claim 49 wherein only a portion of an identification code is encoded in a horizontal line of video information.

53. A system for substituting a stored television program, for a scheduled television program as recited in claim 52 wherein said identification code includes a plurality of bits of code information and one bit of said code information is encoded in a horizontal line of video information.

54. A system for substituting a stored television program for a scheduled television program as recited in claim 52 wherein the active line period of each horizontal line of video information represents a plurality of pixels and each bit of code information is defined by the digital representations of a predetermined number of pixels in the leading overscan portion of said active line period of a horizontal line of video information.

55. A system for substituting a stored television program for a scheduled television program as recited in claim 52 wherein said identification code is encoded multiple times in each frame of video information of said scheduled television program.

56. A system for substituting a stored television program for a scheduled television program as recited in claim 44 including means operable by a panelist for entering marketing research data; and means for storing marketing research data.

57. A system for substituting a stored television program for a scheduled television program as recited in claim 56 including means for controlling said interfacing means to transmit said stored market research data over said telephone line.

58. A system for substituting a stored television program for a scheduled television program as recited in claim 44 wherein said television programs include video information and said storing means stores substitute video information for said substitute television program in compressed form and said control means includes means for expanding said stored substitute video information to couple expanded substitute video information to said television in response to the detection of a predetermined identification code.

59. A system for substituting a stored television program for a scheduled television program as recited in claim 58 wherein said video information includes a plurality of frames, each frame having a plurality of lines, the video information for the first frame of said substitute video information being stored in said storing means and for subsequent frames of said substitute video information, only the video information representing a change from the video information stored for a previous frame being stored in said storing means.

60. A system for substituting a stored television program for a scheduled television program as recited in claim 59 wherein said storing means stores for each line of said frame a beginning code, video change information if any, the location of said video change information and an end code.

61. A system for substituting a stored television program for a scheduled television program as recited in claim 59 wherein said video change information stored in said storing means for a frame subsequent to said first frame represents the differences between said subsequent frame and said first frame.

62. A system for substituting a stored television program for a scheduled television program as recited in claim 59 wherein said video change information stored in said storing means for each frame subsequent to said first frame represents the differences between each subsequent frame and the frame immediately preceding said subsequent frame.

63. A system for substituting a stored television program for a scheduled television program as recited in claim 62 wherein said expanding means includes:
   image memory means for storing an image of a frame of expanded substitute video information;
   means for copying said first frame of substitute video information from said storing means to said image memory means;
   means for copying the video information stored in said image memory means to said gating means; and
   means for updating said image memory means with video change information stored for each subsequent frame after the video information for the preceding frame is copied to said gating means.

64. A system for substituting a stored television program for a scheduled television program as recited in claim 44 further including means for transmitting over said telephone line a substitute television program.

65. A system for substituting a stored television program for a scheduled television program as recited in claim 64 wherein said television programs include video information and said system further includes means for compressing the video information of said substitute television program for transmission over said telephone line in compressed form.

66. A system for substituting a stored television program for a scheduled television program as recited in claim 65 wherein said video information of said television programs include a series of frames each frame having a plurality of horizontal lines and said compressing means includes:
   a source of digital data representing the frames of video information of said substitute television program;
   means for storing the digital data representing a frame of video information of said substitute television program;
   means for comparing the digital data representing a frame subsequent to the frame represented by said stored frame to said stored digital frame data to provide digital data representing changes and the location of said changes within said subsequent frame, said digital change data being stored in said storing means to form a compressed frame of video information of said substitute television program.

67. A system for substituting a stored television program for a scheduled television program as recited in claim 66 wherein said substitute television program includes at least one scene having a plurality of frames and said comparing means compares the digital data representations of each frame subsequent to a first frame of said scene to the digital data representations of said first frame.

68. A system for substituting a stored television program for a scheduled television program as recited in claim 66 wherein said comparing means compares the digital data representing each frame to the digital data representing the immediately preceeding frame.

* * * * *